United States Patent Office 2,997,290
Patented Aug. 22, 1961

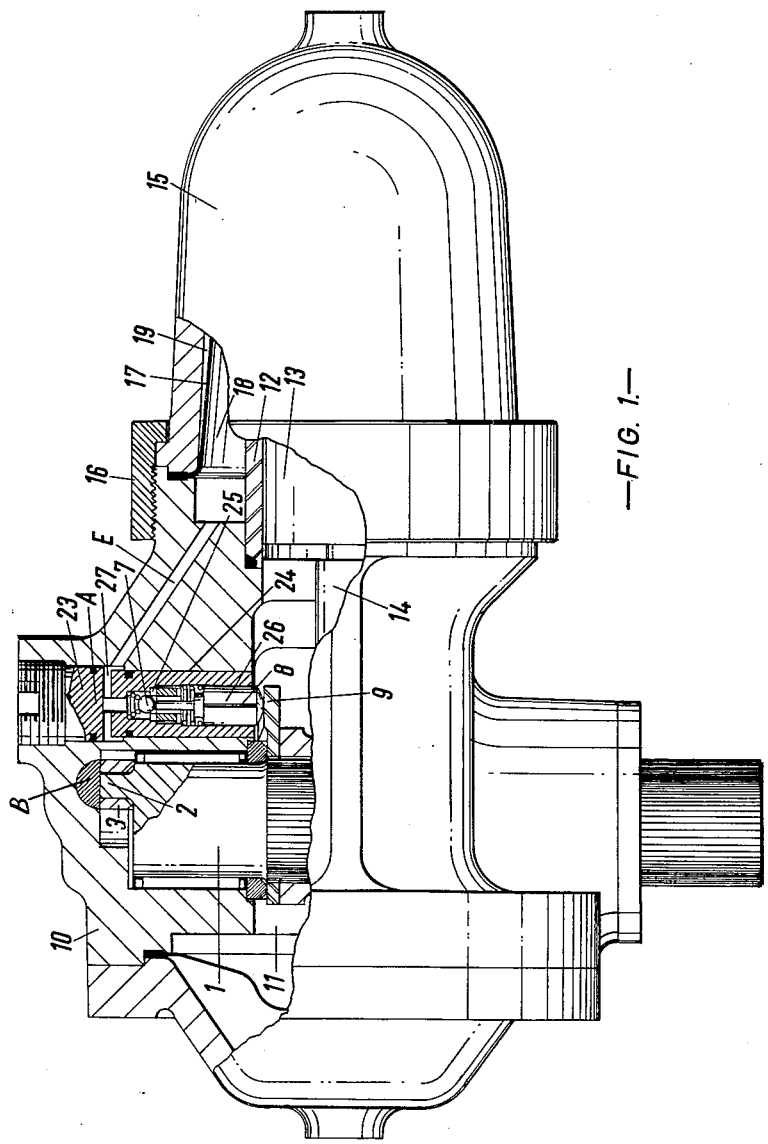

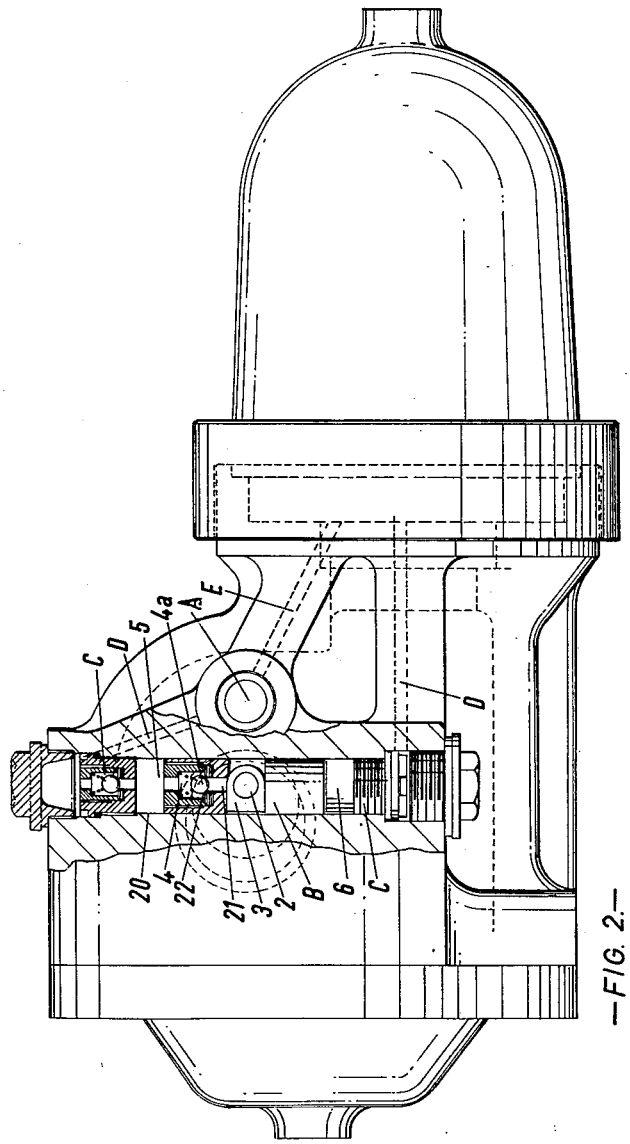

2,997,290
SELF-LEVELLING OR LOAD COMPENSATING HYDRO-PNEUMATIC SUSPENSION UNIT
Jack Wordsworth, York, England, assignor to Armstrong Patents Co. Limited, Beverley, England, a British company
Filed Oct. 2, 1959, Ser. No. 844,134
Claims priority, application Great Britain Oct. 14, 1958
8 Claims. (Cl. 267—15)

This invention concerns vehicle hydro-pneumatic suspension units, that is to say suspension units wherein the functions of a conventional suspension spring and shock absorber usually associated with each wheel mounting are combined within a single unit. The invention relates particularly to such units in which the load exerted on a confined volume of hydraulic medium by a piston, displaceable responsive to vehicle riding movements transmitted to said piston by a spindle adapted for connection to a wheel mounting or to a vehicle body is balanced or cushioned by the pressure of a mass or cushion of gaseous medium, usually air, against which the hydraulic medium acts, said gaseous medium thus serving as a pneumatic suspension spring.

It is particularly desirable in hydro-pneumatic suspension units of the type described to provide means responsive to a change in vehicle loading for automatically restoring the vehicle frame and wheel to a desired relative attitude, and in a number of prior constructions it has already been proposed for this purpose to provide a hydraulic pump operable responsive to vehicle riding movements so as continually to pump hydraulic medium from a reservoir thereof into a space confining said volume of hydraulic medium, a relief valve being arranged to exhaust excess hydraulic medium from said confined space back to the reservoir when the piston attains a position in the suspension unit corresponding to the desired relative position between the vehicle frame and wheel.

It is an object of this invention to provide a suspension unit embodying an improved form of hydraulic pump.

Another object of the invention is to provide such a suspension unit with a readily accessible relief valve.

According to the present invention, in a hydro-pneumatic suspension unit of the type described, there is provided a double acting hydraulic pump comprising a pump plunger reciprocable directly from the spindle of the unit.

Preferably the plunger is arranged in a bore formed in the unit housing adjacent the hydraulic reservoir and said plunger is relieved at a central region thereof to receive a spigot disposed eccentrically on said spindle, hydraulic medium delivery passages being arranged between each end of said bore and said confined space.

The spindle of the unit may further carry a radially extending cam plate against which is resiliently urged an operating member for a relief valve contained within a removable capsule threadedly engaged in the unit body and accessible externally thereof to permit ready adjustment of said valve.

The invention will be described further by way of example with reference to the accompanying drawings, in which:

FIG. 1 is a plan view, partly in section, of a hydro-pneumatic suspension unit embodying the invention; and FIG. 2 is a side elevation thereof, also partly in section.

In the hydro-pneumatic suspension unit shown in the drawings, a spindle 1, which at one end projects from the unit for connection to an appropriate part of a vehicle, is journalled at spaced regions within the body 10. The body 10 is internally formed with a chamber 11 which constitutes a hydraulic reservoir, and from this chamber 11 there extends a cylinder 12 wherein is slidably engaged a piston 13 adapted by way of a connecting rod 14 and a crank (not shown) to be displaced responsive to vehicle riding movements imparted to the spindle 1. The cylinder 12 is surrounded by a domed end cap or cupola 15 which is secured to the body 10 by way of a collar 16 and which also serves to retain in position a flexible diaphragm 17 enclosing the free end of the cylinder 12, so as to define therewith a confined space 18 which is filled with hydraulic medium. A further enclosed space 19 is defined between the flexible diaphragm 17 and cupola 15 and is filled with a gaseous medium under pressure to balance the load exerted on the hydraulic medium in space 18 by the piston 13 and hence to act as a pneumatic suspension spring. The free end of the cylinder 12 is closed by fluid flow restricting means (not shown) to provide a shock absorbing action.

A hydraulic pump adapted by way of delivery passages D (FIG. 2) continually to supply hydraulic medium from the reservoir 11 to the confined space 18 comprises a plunger B received in a bore 20 formed in the body 10 adjacent the chamber 11 and relieved at its centre portion so as to engage a drive shoe 3 carried by a spigot 2 extending eccentrically from the inner end of the spindle 1. The central relieved region of the plunger B communicates directly with the hydraulic reservoir 11, and from each side of said relieved region there leads an axial bore or passage 21 terminating in a valve seat 22 against which is resiliently urged a ball valve member 4a of a recuperation or inlet valve 4. The ends of the bore 20 are closed by non-return delivery valves C between which and the adjacent recuperation valves 4 are defined chambers 5 and 6 respectively. The delivery side of each non-return valve C communicates with one of the delivery passages D. It will be noted that one of said delivery passages D includes a portion E between the confined space 18 and a relief valve A, the function of which will hereinafter more fully be described.

In operation, when the suspension unit described above is mounted on a vehicle, vehicle riding movements are imparted to the spindle 1 which, by way of the spigot 2 and drive shoe 3 causes the plunger B to reciprocate in the bore 20. Thus, referring to that side of the pump which is uppermost in FIG. 2, on each induction stroke of the plunger (i.e. while the other side of the pump is performing a delivery stroke) hydraulic medium is drawn into the chamber 5 by way of the central relieved portion of the plunger B, the passage 21 and recuperation valve 4. On a subsequent delivery stroke of this side of the pump, the plunger then forces the hydraulic medium from the chamber 5, through the non-return valve C and the co-operating delivery passage D into the confined space 18. The addition of hydraulic medium to the space 18 causes the piston 13 to be forced back into the cylinder 12, and this piston movement continues until the relief valve A comes into operation.

The relief valve A will be seen to comprise a capsule 23 adapted for threaded engagement in a bore 24 of the body 10, the capsule 23 being readily accessible externally of the body 10 for removal and adjustment of the relief valve. Within the capsule 23 a ball valve member 7 is resiliently urged against a valve seat 25, and on the other side of the valve seat is engaged by a reduced diameter portion of a valve operating plunger 26. One end of the valve operating member 26 projects slightly beyond the inner end of the capsule 23 and is held in resilient engagement with the cam surface of a cam plate 9 extending radially from the spindle 1. The capsule 23 is also formed with a transverse passage 27 which is connected to both the passage E and to that delivery passage D of which the passage E is a part.

As the piston is caused by the addition of hydraulic medium to the confined space 18 to retract within the cylinder 12, the cam plate 9 is rotatably displaced by the resulting spindle movement, and the arrangement is such that, when the piston reaches the desired position within the cylinder 12, i.e. when the spindle is at a predetermined rotary position with respect to the housing, corresponding to a desired relative attitude of the vehicle frame and wheel, the valve operating member 26 is lifted to displace the ball valve member 7 from the seat 25 and relieve excess hydraulic medium from the space 18 via passage E, the passage 27 formed in the valve capsule 23, past the ball valve 7 and through a groove 8 formed in the member 26 into the chamber 11.

I claim:

1. A hydro-pneumatic suspension unit comprising an at least partly hollow body member having the hollow interior thereof constituting a reservoir for hydraulic medium, a rockable spindle having an intermediate portion thereof and one end journalled in said body member, said spindle passing through said hollow interior, an elongated cylinder extending from said body member and opening at its body member end directly into said hollow interior, a piston displaceable in said cylinder, means connecting said spindle and said piston to effect displacement of said piston responsive to turning movements of said spindle, an elongated elastic diaphragm secured to said body member and enclosing the end portion of said cylinder which is remote from said body member, said diaphragm co-operating with said cylinder to define a confined space adapted to receive a volume of hydraulic medium, said confined space communicating with said remote end of said cylinder, rigid cover means surrounding and enclosing said elastic diaphragm to define a pneumatic chamber adapted to be filled with a pneumatic medium under pressure and thus to constitute a pneumatic suspension spring, said body member being bored transversely to and adjacent said spindle end, a hydraulic pump plunger displaceably received in said bore, said pump plunger being formed with a central relieved portion and with axial passages extending through said plunger from said relieved portion to the plunger ends, said relieved portion communicating with said reservoir, an axially directed, eccentric spigot extending from said spindle end and engaging in the relieved portion of said pump plunger, a pump inlet valve in each of the axial passages of said pump plunger, a pump delivery valve closing each end of said body member bore, a delivery passage leading from each delivery valve to said confined space, and a pressure relief valve operable responsive to spindle turning movement to exhaust hydraulic medium from said confined space to said reservoir when said spindle attains a predetermined rotary position with respect to said body member.

2. A hydro-pneumatic unit as set forth in claim 1, further comprising a second elastic diaphragm secured to said body member and located in the interior of said body member behind said piston, and second cover means spaced from said second diaphragm and closing said body member behind said piston, said second diaphragm and second cover means defining between them a second pneumatic chamber for containing pneumatic medium constituting a pneumatic rebound spring.

3. A hydro-pneumatic suspension unit comprising an at least partly hollow body member having the hollow interior thereof constituting a reservoir for hydraulic medium, a rockable spindle having an intermediate portion thereof and one end journalled in said body member, said spindle passing through said hollow interior, a hydraulic cylinder extending from said body member and opening directly into said hollow interior at the end of said cylinder contiguous with said body member, a piston displaceable in said cylinder, means connecting said spindle and said piston for displacing said piston responsive to turning movements of said spindle, an elastic diaphragm closing the other end of said cylinder and co-operating with said cylinder to define a confined space adapted to receive a volume of hydraulic medium, said confined space communicating with said other end of said cylinder, cover means co-operating with said elastic diaphragm to define a pneumatic chamber adapted to be filled with a pneumatic medium under pressure and thus to constitute a pneumatic suspension spring, said body member being bored transversely to and adjacent said spindle end, a hydraulic pump plunger displaceably received in said bore, said pump plunger being formed with a central relieved portion and with axial passages extending through said plunger from said relieved portion to the plunger ends, said relieved portion communicating with said reservoir, an axially directed eccentric spigot extending from said spindle end and engaging in said relieved portion of said pump plunger, a pump inlet valve in each of the axial passages of said pump plunger, a pump delivery valve closing each end of said body member bore, said body member being further formed with a delivery passage leading from each delivery valve to said confined space, a capsule detachably engaged in said body member and intercepting one of said delivery passages, said capsule being formed with a through passage registering with said delivery passage to enable hydraulic medium flowing through said delivery passage to pass through said capsule, said capsule being further formed with a bore communicating at one end with said through passage and at its other end with the hydraulic reservoir, a pressure relief valve member arranged within and normally closing said capsule bore and means in said capsule displaceable responsive to spindle turning movement for operating said relief valve member to exhaust hydraulic medium from said confined space to said reservoir when said spindle attains a predetermined rotary position with respect to said body member.

4. A hydro-pneumatic suspension unit as set forth in claim 3 further comprising a second elastic diaphragm secured to said body member and located in the interior of said body member behind said piston, and second cover means spaced from said second diaphragm and closing said body member behind said piston, said second diaphragm and second cover means defining between them a second pneumatic chamber for containing pneumatic medium constituting a pneumatic rebound spring.

5. A hydro-pneumatic suspension unit comprising an at least partly hollow body member having the hollow interior thereof constituting a reservoir for hydraulic medium, a rockable spindle having an intermediate portion thereof and one end journaled in said body member, said spindle passing through said hollow interior, a radially arranged cam plate carried by said spindle within said hollow interior, a hydraulic cylinder extending from said body member and opening directly into said hollow interior at the end of said cylinder contiguous with said body member, a piston displaceable in said cylinder, means connecting said spindle and said piston for displacing said piston responsive to turning movements of said spindle, an elastic diaphragm closing the other end of said cylinder and co-operating with said cylinder to define a confined space adapted to receive a volume of hydraulic medium, said confined space communicating with said other end of said cylinder, cover means co-operating with said elastic diaphragm to define a pneumatic chamber adapted to be filled with a pneumatic suspension spring, said body member being bored transversely to and adjacent said spindle end, a hydraulic pump plunger displaceably received in said bore, said pump plunger being formed with a central relieved portion and with axial passages extending through said plunger from said relieved portion to the plunger ends, said relieved portion communicating with said reservoir, an axially directed eccentric spigot extending from said spindle end and engaging in said relieved portion of said pump plunger, a pump inlet valve in each of the axial passages of said pump plunger, a pump delivery valve closing each end of said body member bore, said body member being further formed with a delivery passage leading from each delivery valve to said confined space, a generally cylindrical valve capsule removably engaged in said body member and intercepting one of said delivery passages, said capsule being formed with a transverse through passage registering with said delivery passage to enable hydraulic medium flowing through said delivery passage to pass through said capsule, said capsule being further formed with an axial bore which at one end intercepts said through passage and at its other end communicates with said hydraulic reservoir, a valve seat in said axial bore, a relief valve member resiliently urged into closing relation on said valve seat, and a valve operating plunger arranged in said axial bore with one end of said plunger adapted to engage said valve member and the other end of said plunger projecting from said capsule to bear against said cam plate, said cam plate being so arranged on said spindle as to displace said valve operating plunger when said spindle attains a predetermined rotary position with respect to said body member and thereby to displace said valve member from said valve seat.

6. A hydro-pneumatic suspension unit as set forth in claim 5 further comprising a second elastic diaphragm secured to said body member and located in the interior of said body member behind said piston, and second cover means spaced from said second diaphragm and closing said body member behind said piston, said second diaphragm and second cover means defining between them a second pneumatic chamber for containing pneumatic medium constituting a pneumatic rebound spring.

7. A hydro-pneumatic suspension unit comprising an at least partly hollow body member having the hollow interior thereof constituting a reservoir for hydraulic medium, a rockable spindle having an intermediate portion thereof and one end journalled in said body member, said spindle passing through said hollow interior, an elongated cylinder extending from said body member and opening at its body member and directly into said hollow interior, a piston displaceable in said cylinder, means connecting said spindle and said piston to effect displacement of said piston responsive to turning movements of said spindle, an elongated elastic diaphragm secured to said body member and enclosing the end portion of said cylinder which is remote from said body member, said diaphragm co-operating with said cylinder to define a confined space adapted to receive a volume of hydraulic medium, said confined space communicating with said remote end of said cylinder, rigid cover means surrounding and enclosing said elastic diaphragm to define a pneumatic chamber adapted to be filled with a pneumatic medium under pressure and thus to constitute a pneumatic suspension spring, said body member being bored transversely to and adjacent said spindle end, an axially directed, eccentrically arranged spigot extending from said spindle end towards said bore, and double-acting hydraulic pump means including a centrally recessed pump plunger displaceably received in said bore and having its central recess engaged by said spigot, said body member being formed with hydraulic medium delivery passages arranged between each end of said bore and said confined space.

8. A hydro-pneumatic unit as set forth in claim 7, further comprising a second elastic diaphragm secured to said body member and located in the interior of said body member behind said piston, and second cover means spaced from said second diaphragm and closing said body member behind said piston, said second diaphragm and second cover means defining between them a second pneumatic chamber for containing pneumatic medium constituting a pneumatic rebound spring.

References Cited in the file of this patent

UNITED STATES PATENTS 2,825,579     Heiss                Mar. 4, 1958